3,143,427
METHOD OF PROCESSING OVALBUMEN
Karl Thies, Prosslstrasse 18, Munich 9, Germany
No Drawing. Filed July 25, 1960, Ser. No. 44,889
Claims priority, application Germany July 30, 1959
5 Claims. (Cl. 99—114)

The present invention relates to a method of processing ovalbumen or the white of egg.

It is the object of the present invention to provide for a method of processing ovalbumen lowering the concentration of albumen as well as its degree of viscosity.

It is another object of the present invention to provide a method of processing ovalbumen lowering the concentration of albumen as well as its degree of viscosity without impairing and changing its typical processing properties.

These objects as all further objects and advantages of the present invention which will become apparent as the description thereof proceeds are accomplished by the method of the present invention, which is based on the entirely unexpected and surprising discovery that the concentration of albumen of the white of egg as well as its degree of viscosity can be considerably lowered without prejudice to the typical processing qualities of the white of egg, by subjecting the same to a homogenizing process in admixture with whey. By whey it is intended to understand both, sour whey and rennet whey as well as mixtures of both.

According to the invention the whey is added to the ovalbumen as, for instance, chicken's white of egg, and both substances are then thoroughly mixed in a suitable, highly efficient mixer, e.g., an ultrasonic mixer, until the mixture is perfectly homogenized and neither of the two constituents tends to separate from the other.

As a result a finely dispersed mixture of proteins is obtained. It has been found that the concentration of albumen and the degree of viscosity can be reduced down to a ratio of 1:1, the ratio referring to the proportion of whey added to the ovalbumen.

After viscosity and concentration have been so reduced, the protein mixtures can be passed through an ion exchanger without any difficulty. It can be passed, e.g., through a cation exchanger as, for instance, an exchanger of the sulfurized polystyrol type, whereupon the heat resistance of the protein mixture has been so greatly increased that it can be safely sterilized at a temperature of 100° C.

If desired, the mixture may thereafter be passed through an anion exchanger which can be strongly alkali, so as to raise the pH value of the protein mixture, e.g., to the order of about 8. Alternatively, in lieu of ion exchange, a substance selected from the group of alkalies can be added to the homogenized mixture of ovalbumen and whey so as to raise the pH value to about from 7 to 9.

Instead of being passed through the cation exchanger the protein mixture can be supplied with a determined amount of a suitable acid, such as, for instance, citric acid to lower the pH value down to a value in the order of 2. It has been found that a similar effect is obtained as accomplished by treatment in the cation exchanger, i.e., the temperature resistance of the mixture is improved. The increase of temperature resistance is in direct proportion to increasing degree of acidity of the mixture.

The reduced viscosity and albumen concentration make it furthermore possible to sterilize the albumen by cold filtering.

In addition, it was found, that the protein mixture thus treated can be passed through a heat exchanger in a continuous stream without causing any coagulation as is the case with untreated albumen. This is particularly useful if the mixture is to be selectively sterilized so as to eliminate a specific group of bacteria, such as bacteria of the paratyphoid group.

The invention will be further described by the following examples which are not to be considered as limitative of the scope or applicability of the invention.

Example I 100 liters of chicken's white of egg are mixed with 25 liters of sour whey in a suitable mixer introducing a minimum of air into the mixture, until both substances form a stable, homogeneous mass none of whose constituents tend to separate from each other. The protein mixture thus obtained is then passed through a cation exchanger charged with H-ions. The cation exchanger may be of the type of a sulfurized polystyrol. The mass can then be sterilized by heating up to a temperature of 90° C.

Example II 100 liters of chicken's white of egg are intimately mixed with 50 liters of rennent whey in an ultrasonic mixer. The mixture is then passed through a cation exchanger charged with H-ions, whereupon the mass can be sterilized as in Example I, or, if desired, can be neutralized in an anion exchanger to a pH-value of about 7.5 and can then be sterilized as described in Example I.

Example III 100 liters of chicken's white of egg are thoroughly mixed with 100 liters of sour whey, as described in Example I or Example II. 800 grams of citric acid are then added to the mixture slowly and under constant stirring, thereby adjusting the pH-value of the mixture to 2.5. This substance can be sterilized according to Example I, or it can be neutralized in an anion exchanger to a slightly alkali value of 8.5.

Example IV 100 liters of chicken's white of egg are homogenized with 50 liters of rennet whey according to Example I or Example II. Thereafter, 500 grams of citric acid are added to the mixture slowly and under constant stirring, thereby reducing the pH-value of the mixture to 3. It can then be heated to a temperature of 80° C. for a short period in the order of 1 minute without coagulating. This heating period is sufficient for killing all bacteria of the paratyphoid group. The substance can then be neutralized by the addition of an alkali whereupon it can be filled into containers for deep freeze storing.

Example V 100 liters of chicken's white of egg are intimately mixed with 100 liters of sour whey. Slowly and under constant stirring 900 grams of citric acid are added until a pH-value of 2.3 has been reached. The sour substance is then passed through an anion exchanger and is neutralized to a pH-value of 7.5. The neutralized substance is then continuously passed through a heat exchanger and heated to a temperature of 85° C., and is then filled into cans. The cans are closed and can be shortly heated, e.g., at a temperature of 80° C. for a period of 20 minutes. The albumen is then susceptible to storing.

Example VI 100 liters of chicken's white of egg are intimately mixed with 60 liters of rennet whey and are passed through a cation exchanger. The material, then having a pH-value of 2 is sterilized as in Example V by passing continuously through a heat exchanger. It is then deep frozen and stored.

Example VII 100 liters of chicken's white of egg are homogenized with 75 liters of rennet whey as described in Example I or Example II and are passed through a cation exchanger so as to reach a pH-value of 2.5. Thereafter a 30% solution of sodium hydroxide is slowly added to the mixture, until its pH-value has reached 8. The substance is then passed continuously through a heat exchanger and is therein heated to a temperature of 85° C. It is then filled into cans, which latter are briefly heated to a temperature of 90° C. for a period of 10 minutes, whereupon the cans can be stored.

Example VIII 100 kilograms of ovalbumen are mixed with 100 kilograms of rennet whey. The mixing is carried out in a slowly rotating highly efficient rotary mixer for a period of about an hour. The formation of foam is to be prevented, and a perfectly homogeneous mixture is obtained after the mixing process. The protein mixture is then conveyed by a stepless pump, with the throughput rate as well as the pressure being controlled, the initial pressure being kept low, e.g., in the order of 2 to 3 atmospheres. The pump conveys the mixture to a filter whereby it is sterilized by filtering.

Example IX 2.5 kilograms of dried chicken's white of egg are given into 47.5 kilograms of whey slowly and under constant stirring. After the aforementioned step has been completed, and after an interval of about 6 hours the mixture is further stirred and intimately mixed for a period of about 30 minutes.

In order to obtain a highly sterile product the mixture is passed through a sterilizing filter. The substance is then deep frozen and can be stored in a deep freezer.

It will be noted that at least about 20% of whey should be added to the ovalbumen to enable processing of the latter in an ion exchanger, and approximately at least 25% should be added to facilitate filtering of the product.

Instead of citric acid, any other suitable alimentary acid can be employed in order to decrease the pH value of the mixture as above described, or HCl or $H_2SO_4$ if the product is to be used for technical purposes.

The products processed according to the invention can be used with great advantage in the food industry, and particularly in the bakery industry. It can furthermore be used for technical purposes.

It will be understood that this invention is susceptible to further modification and, accordingly, it is desired to comprehend such modifications within this invention as may fall within the scope of the appended claims.

What is claimed is:

1. Method for reducing the albumen concentration and the degree of viscosity of ovalbumen while preserving the typical processing properties of the latter, comprising the steps of adding not more than about an equal volume of whey to liquid ovalbumen, mixing the ovalbumen and the whey until a perfectly homogenized mixture is obtained and adding an alimentary acid to the homogenized mixture so as to obtain a pH value of about 2–3.

2. Method for reducing the albumen concentration and the degree of viscosity of ovalbumen while preserving the typical processing properties of the latter, comprising the steps of adding not more than about an equal volume of whey to liquid ovalbumen, mixing the ovalbumen and the whey until a perfectly homogenized mixture is obtained; lowering the pH of the resultant homogenized mixture to about 2–3; heating the acidified mixture to sterilize same; and adding to the mixture a substance selected from the group of alkalies so as to raise its pH value to about from 7 to 9.

3. Method for reducing the albumen concentration and the degree of viscosity of ovalbumen while preserving the typical processing properties of the latter, comprising the step of adding not more than about an equal volume of whey to liquid ovalbumen, with the proportion between the ovalbumen and the whey being at least 25% of albumen, mixing the ovalbumen and the whey until a homogenized mixture is obtained, and passing the mixture through a sterilizing filter.

4. A method for reducing the albumen concentration and the degree of viscosity of ovalbumen while preserving the typical processing properties of the latter, comprising the steps of; adding not more than about an equal volume of whey to liquid ovalbumen with the proportion between the ovalbumen and the whey being at least 20% of ovalbumen; mixing the ovalbumen and the whey until a perfectly homogenized mixture is obtained; and passing the homogenized mixture through an ion exchanger so as to obtain a pH value of about 2–3.

5. A method for reducing the albumen concentration and the degree of viscosity of ovalbumen while preserving the typical processing properties of the latter, comprising the steps of; adding not more than about an equal volume of whey to liquid ovalbumen with the proportion between the ovalbumen and the whey being at least 20% of the resultant homogenized mixture to about 2–3; heating the acidified mixture to sterilize same; and passing the sterilized mixture through an ion exchanger to raise its pH value to about 7–9.

References Cited in the file of this patent

UNITED STATES PATENTS

| | | |
|---|---|---|
| 2,650,166 | Tinkler et al. | Aug. 25, 1933 |
| 2,243,868 | Katzman | June 3, 1941 |
| 2,349,969 | Kremers | May 30, 1944 |
| 2,695,235 | Goede | Nov. 23, 1954 |
| 2,950,204 | Peebles | Aug. 23, 1960 |